United States Patent [19]

Goldsby

[11] 3,742,081
[45] June 26, 1973

[54] SEPARATE RECOVERY OF DIISOPROPYL SULFATE AND DIBUTYL SULFATE IN AN ALKYLATION ACID RECOVERY PROCESS

[75] Inventor: Arthur R. Goldsby, Chappaqua, N.Y.

[73] Assignee: Texaco Inc., New York, N.Y.

[22] Filed: Nov. 4, 1971

[21] Appl. No.: 195,797

[52] U.S. Cl. .................... 260/683.62, 260/683.61
[51] Int. Cl. .............................................. C07c 3/54
[58] Field of Search ............... 260/683.62, 683.61, 260/683.59

[56] References Cited
UNITED STATES PATENTS

| | | | |
|---|---|---|---|
| 3,234,301 | 2/1966 | Goldsby | 260/683.62 |
| 3,422,164 | 1/1969 | Goldsby | 260/683.62 |
| 3,442,972 | 5/1969 | Massa | 260/683.62 |
| 3,448,168 | 6/1969 | Goldsby | 260/683.62 |
| 3,502,742 | 3/1970 | Goldsby | 260/683.61 |

Primary Examiner—Delbert E. Gantz
Assistant Examiner—G. J. Crasanakis
Attorney—Thomas H. Whaley

[57] ABSTRACT

A sulfuric acid alkylation process wherein acid consumption is reduced by reacting spent acid with propylene and butylene to form diisopropyl sulfate and dibutyl sulfate in an olefin absorption zone and wherein the dibutyl sulfate and diisopropyl sulfate are separately recovered in an extraction zone. The efficiency of the alkylation reaction and the quality of alkylated products are enhanced by passing the recovered dibutyl sulfates and diisopropyl sulfates to separate alkylation reaction zones.

6 Claims, 1 Drawing Figure

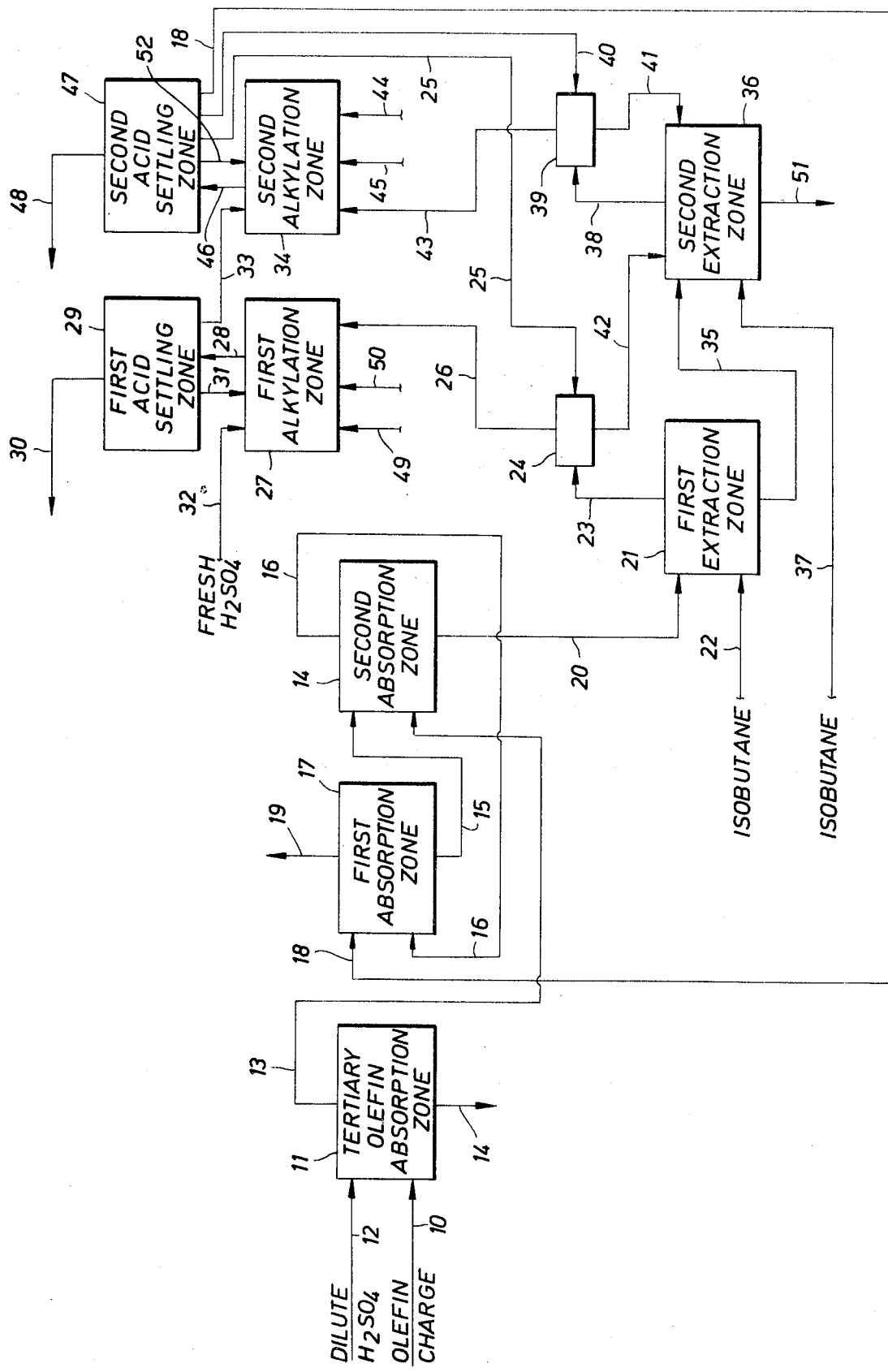

SEPARATE RECOVERY OF DIISOPROPYL SULFATE AND DIBUTYL SULFATE IN AN ALKYLATION ACID RECOVERY PROCESS

BACKGROUND OF THE INVENTION

The present invention relates to the sulfuric acid catalyzed alkylation of isoparaffin hydrocarbons with olefins and olefin derived compounds. More particularly, spent sulfuric acid catalyst from the alkylation process is treated with olefin hydrocarbons in an absorption zone to convert a portion of said sulfuric acid into alkyl sulfates and to the subsequent recovery of the alkyl sulfates in an extraction zone. Specifically, the present invention relates to a method for treating a used sulfuric acid alkylation catalyst with a stream comprising butylene and propylene to form diisopropyl sultates and dibutyl sulfates, and the subsequent recovery in an extraction zone of a stream enriched in dibutyl sulfates and a second stream enriched in diisopropyl sulfates. The dibutyl sulfate containing stream and the diisopropyl sulfate containing stream may be reacted with isoparaffin hydrocarbon in an alkylation zone to form alkylated hydrocarbon products.

The above alkylation process and the process for converting used sulfuric acid catalyst into alkyl sulfates are well known in the prior art. It is also well known to recover alkyl sulfates from an absorption effluent by extraction into a liquid hydrocarbon. For example, such processes are described in U.S. Pat. Nos. 3,564,073; 3,462,512; 3,580,962; 3,502,742; 3,227,774; 3,227,775; 3,422,164; 3,428,705; 3,448,168; 3,234,301; and pending U.S. Pat. applications Ser. Nos. 49,693, filed June 25, 1970, which issued as U.S. Patent 3,725,499 on Apr. 3, 1973; and 102,689, filed Dec. 30, 1970, which issued as U.S. Pat. No. 3,673,271 on June 27, 1972.

In the prior art, used sulfuric acid alkylation catalyst, containing contaminants such as water, conjugated polymers and the like is treated in an absorption zone with an olefin containing stream to convert a substantial portion of the sulfuric acid into dialkyl sulfates. The olefin containing stream may be in the liquid phase or in the vapor phase and may contain a substantial portion of inert paraffinic hydrocarbons. It is known to separate the absorption zone effluent into an acid phase containing the major portion of the dialkyl sulfates and a hydrocarbon phase containing a minor portion of the dialkyl sulfates in a separation zone by such means as gravity settling or the like. It is further known that when the olefin stream comprises a substantial portion of inert paraffinic hydrocarbons, to remove such hydrocarbons from the alkylation process by such means as venting the vaporized inert hydrocarbons. The absorption zone may comprise one or a plurality of absorption steps. Although it has been preferred to employ a propylene containing stream substantially free of butylenes and heavier olefins in the absorption process, butylene and amylene containing streams may be employed in the absorption process. However, tertiary olefins which may be present in such streams tend to polymerize under the conditions employed in the absorption process. Such polymers, which are highly unsaturated, are recovered with the dialky sulfates in the subsequent extraction step and become elements of the charge to the alkylation reaction. Such unsaturated polymers react with isoparaffin to form undesirably heavy alkylation products and consume a substantial amount of sulfuric acid catalyst in the alkylation process. Methods for treating a tertiary olefin containing stream to remove tertiary olefins therefrom are known. For example see U.S. Pat. No. 3,502,742 and U.S. application Ser. No. 49,693 filed June 25, 1970.

The acid phase separated from the absorption effluent contains a major portion of the dialkyl sulfates formed as well as acid alkyl sulfates, unreacted sulfuric acid, water, conjugated polymeric oils and other catalyst contaminants. The dialkyl sufates may be recovered from the acid phase by extraction into a hydrocarbon liquid. Preferably, isoparaffins such as isobutane and isopentane are employed to extract the dialkyl sulfates. Other hydrocarbon liquids such as propane, butane, pentane, hexane and mixtures thereof may also be employed to extract the dialkyl sulfates. According to the methods of the prior art, an absorption zone acid phase is treated with a hydrocarbon liquid such as isobutane in an extraction zone at a temperature of between about 0°F. and 100°F. to extract the dialkyl sulfates. From the extraction zone, an extract phase comprising hydrocarbon liquid, dialkyl sulfates, and a small amount of polymeric oils is recovered and may be subject to further treatment with strong sulfuric acid to remove the polymeric oils therefrom. The treated extract, substantially free of polymeric oils, may then be charged into an alkylation zone wherein the dialkyl sulfates react with isoparaffin hydrocarbons to yield alkylated hydrocarbon and 100 percent sulfuric acid.

In an alkylation process wherein propylene or propylene derived compounds are alkylated with isoparaffin such as isobutane, it is preferable to have butylenes also present in an amount up to about 35 percent. The presence of butylene in the alkylation reaction improves the efficiency of the alkylation reaction of propylene with the isoparaffin hdyrocarbons. When dialkyl sulfates are employed as reactants in an alkylation reaction, it is known to employ additional olefin reactants such as propylene and butylene to obtain the desired yield and quality of alkylated hydrocarbons.

In the prior art dialkyl sulfates are extracted from the absorption effluent without consideration of their alkyl constituents. In the event that an olefin containing stream comprising a mixture of olefin hydrocarbon such as propylene and butylene is employed in the absorption step, then it has been the common practice to recover a mixture of alkyl sulfates such as diisopropyl sulfate and dibutyl sulfate in the extract phase from the extraction step.

SUMMARY OF THE INVENTION

Now, according to the present invention an improved method is disclosed for extracting dialkyl sulfates from an absorption zone acid phase wherein the mixed dialkyl sulfates are recovered as a first extract phase enriched in dibutyl sulfates and as a second extract phase enriched in diisopropyl sulfates. An absorption step acid phase comprising diisopropyl sulfate, dibutyl sulfate, acid alkyl sulfates, unreacted sulfuric acid, and catalyst contaminants is contacted with liquid isobutane in a first extraction zone at a temperature of from about 0°F. to about 20°F. and in a mole ratio of isobutane to dibutyl sulfate of from about 1/1 to about 6/1. Effluent from the first extraction step is separated into an extract phase comprising isobutane and dibutyl sulfate and a raffinate phase. The raffinate phase is treated with isobutane in a second extraction zone at a temperature of from about 30°F. to about 50°F. in a mole ratio of isobutane to dialkyl sulfates of from about 2/1 to about 10/1. Effluent from the second extraction zone is separated into an extract phase comprising isobutane and diisopropyl sulfate and a spent acid phase.

One advantage of the present invention is that an acid phase from an absorption zone containing diisopropyl sulfate and dibutyl sulfate may be treated to yield a first extract enriched in dibutyl sulfates and a second extract enriched in diisopropyl sulfate. The separated extract streams may then be subjected to a selected alkylation process to yield desired alkylation reaction products. For example, the dibutyl sulfate enriched extract may be charged to a separate alkylation reaction wherein a high quality alkylate suitable for aviation gasoline is produced by alkylating isobutane with such dibutyl sulfates.

BRIEF DESCRIPTION OF THE DRAWING

The attached drawing is a schematic flow diagram of an alkylation process employing the improved extraction method of the present invention.

DETAILED DESCRIPTION OF THE INVENTION

With the invention of my improved extraction process, it is possible to obtain a low net acid consumption in an alkylation process and at the same time to employ olefin charge stocks not readily usable in conventional alkylation reactions. In my invention an olefin feed stream comprising propylene and butylene is processed in an absorption zone with used sulfuric acid alkylation catalyst containing alkylation contaminants such as conjugated dienes and water. The olefin stream is reacted with used alkylation catalysts to form dibutyl sulfate and diisopropyl sulfate.

According to the present invention an acid phase comprising dibutyl sulfates, diisopropyl sulfate, water, acid alkyl sulfates, polymer oils, and unreacted sulfuric acid is recovered from the absorption zone. This acid phase is treated in a first extraction zone to yield a first extract rich in dibutyl sulfate. The acidic raffinate from the first extraction zone is treated with a light hydrocarbon liquid in a second extraction zone to yield a second extract rich in diisopropyl sulfate.

The solubility of dialkyl sulfates in light hydrocarbons increases with the molecular weight of the alkyl group. Thus, dibutyl sulfate is easier to extract from the absorption zone acid phase than diisopropyl sulfate. Likewise, dialkyl sulfates are easier to extract than acid alkyl sulfates wherein both compounds contain the same alkyl group. The method of this invention employs this solubility difference to effect a separation of dibutyl sulfate from diisopropyl sulfate and acid alkyl sulfates contained in an absorption zone acid phase.

The dibutyl sulfate may be extracted from the acid phase in the first extraction zone employing a light hydrocarbon liquid. Hydrocarbon liquids such as propane, butane, pentane, and hexane may conveniently be used to extract the dibutyl sulfate. Preferably, where the dibutyl sulfate is to be employed in an alkylation reaction, the acid phase is extracted with an isoparaffin hydrocarbon which is suitable as a reactant in the alkylation reaction step. Preferably the liquid hydrocarbon extractant is selected from isobutane and isopentane. In order to preferentially extract the dibutyl sulfate from the acid phase in the first extractor, the operating conditions must be carefully controlled. The mole ratio of liquid hydrocarbon extractant to dibutyl sulfate contained in the acid phase is maintained at from about 1/1 to about 6/1. The solubility of dialkyl sulfates in light liquid hydrocarbons increases with increasing temperature, and dialkyl sulfates with alkyl groups of a higher molecular weight are soluble in a liquid hydrocarbon at lower temperatures than dialkyl sulfates containing alkyl groups of a lower molecular weight. Therefore, to extract dibutyl sulfates preferentially from an acid phase also containing diisopropyl sulfate, an extraction temperature in the range of from about 0°F. to about 20°F. is particularly advantageous. At temperatures below about 0°F., the dibutyl sulfate is relatively insoluble and substantial portions of such dibutyl sulfate remain dissolved in the acid phase. At temperatures above about 20°F., the solubility of diisopropyl sulfate is such that substantial amounts of diisopropyl sulfate will dissolve in the liquid hydrocarbon of the first extractor thereby preventing a good separation between the dibutyl sulfates and the diisopropyl sulfates.

The first extraction step may be carried out in equipment known in the art, for example, in mixer settlers, centrifugal contactors or counter-current towers such as rotating disc contactors. Preferably, a multi-stage countercurrent contactor is employed to improve the separation of dibutyl sulfate from the diisopropyl sulfate. A reasonably short contact time in the extraction zone is preferred. A few minutes residence time with good contact is satisfactory.

The first extract phase comprising liquid isoparaffin hydrocarbons and dibutyl sulfate may contain some diisopropyl sulfate depending upon the liquid isoparaffin hydrocarbon to dibutyl sulfate ratio, the extraction temperature, and the number of extraction stages employed. Additionally, the first extract phase may contain unsaturated polymerized oils. A substantial portion of any diisopropyl sulfate and polymer oils contained in the first extract may be removed by treating the first extract with strong sulfuric acid. Strong sulfuric acid such as fresh makeup acid used for the alkylation step or spent alkylation acid of at least about 90 percent purity by weight may be employed in the acid treatment of the first extract phase. Weaker acid may be used, but considerably more acid is required to react with the polymer oils and consequently more dialkyl sulfates are dissolved into the acid phase. The polymer oils apparently form an acid-oil complex with the strong sulfuric acid which is substantially insoluble in a liquid hydrocarbon. Alkyl sulfates are soluble in the acid-oil complex which is formed. Diisopropyl sulfate is relatively more soluble in the acid-oil complex than is dibutyl sulfate. Thus, by adding sufficient sulfuric acid to react with the polymer oils present in the first extract phase, diisopropyl sulfate is preferentially dissolved into the resulting acid-oil complex thereby further improving the separation between dibutyl sulfate and diisopropyl sulfate. The acid-oil complex formed is a relatively viscous liquid which is insoluble in the liquid hydrocarbon. A separation between the first extract phase and the acid-oil complex may be effected by a separation means such as gravity settling. The acid treatment of the first extract phase may be carried out at a temperature of up to 80°F. for a period of several hours as the alkyl sulfates and the acid-oil complex are stable under such operating conditions. Preferably the acid treatment is carried out at a temperature of from about 40°F. to about 60°F. employing a short contact time of a few minutes duration.

For if excess acid is present, high temperatures and long contact times may lead to adverse reactions such as conversion of dialkyl sulfates to acid alkyl sulfates and hydropolymerization reactions. The hydrocarbon phase recovered from the first treater comprising liquid hydrocarbon and dibutyl sulfate is suitable for use such as charge as a reactant to an alkylation step as is hereinafter described.

Raffinate from the first extractor step comprises diisopropyl sulfate, acid alkyl sulfates, unreacted sulfuric acid, and acid contaminants such as polymer oils and water. The diisopropyl sulfate contained in the raffinate may be recovered by treating with a light hydrocarbon liquid in a second extraction zone. Preferably the light hydrocarbon liquid employed in the second extraction zone is isobutane or isopentane. The diisopropyl sulfate is less soluble in liquid hydrocarbons than dibutyl sulfate. Therefore, it is preferable to employ a liquid hydrocarbon to diisopropyl sulfate mole ratio of from about 2/1 to about 10/1 in the second extraction step. The solubility of diisopropyl sulfate into liquid hydrocarbon increases with increasing temperature and an extraction temperature in the range of from about 20°F. to about 60°F. in the second extraction zone is preferred. A significant portion of the acid alkyl sulfates present in the acid raffinate phase from the first extractor may also be recovered by employing sufficient liquid hydrocarbon and a relatively high extraction temperature in the second extraction zone. If desired, water up to about 5 percent may be added to the acid raffinate phase, according to the method disclosed in U.S. Pat. No. 3,227,774, whereupon the dialkyl sulfates and acid alkyl sulfates contained in the acid phase are relatively more easily extracted from the acid phase. A second extract comprising liquid hydrocarbon, diisopropyl sulfate, other alkyl sulfates and polymer oil is recovered from the second extraction step. This second extract phase may be treated with strong sulfuric acid to remove the highly unsaturated polymer oils therefrom. The acid-oil complex thus formed between the strong sulfuric acid and the unsaturated polymer oils is insoluble in the light hydrocarbon liquid. The acid-oil complex may be separated from the second extract phase by such means as gravity settling. This acid-oil complex which contains some dissolved alkyl sulfate may be returned to the second extraction step wherein the dissolved alkyl sulfates are recovered by extraction into the liquid hydrocarbon solvent.

The raffinate phase from the second extraction step, comprising acid-oil complex, acid alkyl sulfates, acid contaminants, and unreacted sulfuric acid is removed from the second extraction zone. This second raffinate phase may be disposed of by such means as burning in a sludge conversion unit or by other suitable disposal means.

The acid phase charge to the first extraction zone is obtained from an absorption zone wherein an olefin containing stream is reacted with used sulfuric acid alkylation catalyst. The olefin containing stocks which may be employed in the practice of the present invention are those containing propoylene and butylene. Such olefin containing stocks may comprise a major portion of propylene and butylene, or such olefins may be present in the stock in a minor amount. Such olefin stocks may comprise a major portion of inerts which may be eliminated in the absorption step. For example, tail gas from a gas recovery process. Preferably, for the present invention, propylene and butylene will be present in the olefin stock in a substantial ratio to one another such that the dialkyl sulfates present in the absorption zone acid phase will comprise a substantial portion of dibutyl sulfate and diisopropyl sulfate.

Butylenes present in the usual olefin containing gases available in a refinery comprise a substantial portion of isobutylene. Isobutylene in the presence of strong sulfuric acid tends to form unsaturated polymers which are hydrocarbon soluble. Such isobutylene polymers dissolve into the hydrocarbon solvent in the extraction step and may be subsequently charged to an alkylation zone wherein they undergo an alkylation reaction. Such isobutylene polymers in the alkylation zone consume substantial amounts of acid catalyst and produce alkylated hydrocarbons having an undesirably high boiling temperature. When treating an olefin stock containing isobutylenes, very low temperatures and short contact times in the absorption zone are preferred to minimize the formation of isobutylene polymers. Alternatively, isobutylene may be selectively removed from an olefin stock by treating the olefin stock with weak sulfuric acid as disclosed in U.S. Pat. No. 3,502,742; or by treating the olefin stock with a catalyst as disclosed in U.S. application Ser. No. 49,693, filed June 25, 1970, now U.S. Pat. No. 3,725,499.

The absorption of olefins from an olefin stock with strong sulfuric acid may be carried out with the olefin stock in the vapor phase or in the liquid phase. If desirable, the absorption of olefins may be carried out in two steps wherein the olefin stock in the vapor phase is contacted with strong acid to recover a major portion of the olefins and reject the inert components of the olefin stock, followed by a liquid phase absorption step to insure conversion of a major portion of the sulfuric acid to dialkyl sulfates.

Used alkylation acid with a titratable acidity of from about 88 percent to about 93 percent by weight is a preferred acid charge stock to the absorption step. Fresh acid, or acid from other sources may be used in the absorption step, although strong acid such as is employed in an alkylation reaction is preferred. Olefin to acid mole ratios of from about 2/1 or higher may be employed in the absorption step wherein the olefins comprise propylene, butylene and amylene. Ethylene, under the preferred operating conditions in the absorption step is relatively unreactive with sulfuric acid. The formation of diethylene sulfates in the absorption step is to be discouraged since, in a subsequent alkylation step, the ethylene will consume large amounts of acid and produce alkylated hydrocarbons having a relatively low octane number. Propylene and butylene are substantially more reactive with sulfuric acid under the preferred absorption step operating condition than ethylene. Therefore, if sufficient propylene and butylene are present to react with the sulfuric acid, the presence of ethylene in the olefin stock will not substantially interfere with the formation of the desired diisopropyl sulfate and dibutyl sulfate. Amylenes present in the olefin stock will react with sulfuric acid in the absorption step and, according to the method of the present invention, be recovered as diamyl sulfates with the dibutyl sulfates in the first extract phase.

Temperatures in the absorption step are preferably maintained in the range of from about 20°F. to about 60°F. At temperatures above about 60°F. side reactions such as polymerization of the olefins may occur. At temperatures below about 20°F. the reaction of olefins to form dialkyl sulfates is relatively slow.

The absoprtion step may be effected in contacting equipment well known in the prior art, such as mixer settlers, centrifugal contactors, counter-current towers or two or more mechanically stirred reactors operating to give counter-current flow. Counter-current flow contact is preferred to obtain a high conversion of sulfuric acid to dialkyl sulfate, and, in most cases, to obtain a high conversion of the olefin to dialkyl sulfates. Another advantage of employing counter-current flow in the absorption step is that inerts contained in the olefin stock may be readily rejected from the system. By rejecting such inerts, the concentration of desired reactants in the subsequent alkylation step may be maintained at desirably high concentrations and the refrigeration load upon the alkylation process may be substantially reduced.

Operating conditions for the alkylation step are generally those which are well known in the prior art. In this invention a substantial portion of the alkylation acid catalyst is charged to the alkylation zone as dialkyl sulfates. Preferably, a major portion of such acid catalyst comes from dialkyl sulfates and only a minor portion is charged as fresh makeup acid of from about 98 percent to about 99.5 percent concentration. The alkyl sulfates recovered according to the method of the present invention are substantially water free, thus the alkylation catalyst tends to be of low water content and of generally quality. qualtiy. Consequently, by charging a substantial portion of the sulfuric acid catalyst to the alkylation zone as dialkyl sulfates, an alkylate having a low endpoint temperature and a high octane number may be obtained.

If desired, less drying of the hydrocarbon charge stock to the alkylation step may be employed such that the water content of the acid catalyst may be as high as in conventional alkylation operations.

The concentration of sulfuric acid in the acid catalyst is maintained at from about 88 percent to about 95 percent by weight in the alkylation zone. The acid catalyst concentration is maintained at the desired value by purging spent acid from the alkylation zone and adding acid either as high purity fresh makeup acid or as dialkyl sulfates to the alkylation zone. In multiple reactor systems, acid catalyst of the lowest concentration will be purged and sent to the absorption step for reaction with olefins to form dialkyl sulfates.

To obtain a satisfactory alkylation reaction, excess isoparaffin hydrocarbons are employed in the alkylation reaction mixture. The hydrocarbon phase of the alkylation reaction mixture may comprise from about 60 percent to about 80 percent by volume of isoparaffin hydrocarbons. Therefore, large volumes of isoparaffin hydrocarbon are recovered from the alkylation effluent and are recycled to the alkylation process. A portion of such recycle isoparaffin hydrocarbon may be used in the extraction steps to extract the dialkyl sulfates from the absorption step acid phase. Preferably the isoparaffin hydrocarbon comprises isobutane, isopentane or mixtures thereof.

Additional fresh olefins, over that charged to the alkylation zone as dialkyl sulfate, is usually charged to the alkylation zone. In the alkylation of propylene, as diisopropyl sulfate, it is advantageous to employ butylenes also in the alkylation reaction zone. Preferably butylenes are present in such a propylene alkylation zone in an amount such that the butylenes comprise about 35 percent of the olefins present in the reaction zone.

In the application of my invention wherein a dibutyl sulfate rich extract is recovered separate from a diisopropyl sulfate rich extract, two or more alkylation zones may be employed. For example, the dibutyl sulfate rich extract phase may be charged to a first alkylation zone along with additional butylene to produce a high octane low endpoint alkylate. Such alkylate is suitable for aviation gasoline. The diisopropyl sulfate rich extract may then be charged to a second alkylation zone along with additional fresh butylene and/or propylene to form a high octane alkylate. This propylene alkylate is suitable for automobile gasoline. The improvement of the present invention may be applied in many other specific ways which occur because of existing conditions or because of the composition and/or availability of olefin charge stocks.

The extraction method of the present invention may be better understood by reference to the accompanying drawing and the detailed description which follows. The drawing illustrates one arrangement of apparatus in which the improved method of this invention can be practiced. It is not intended to limit the invention to the particular apparatus and materials described. To those skilled in the art, many modifications will be obvious which are within the spirit and scope of the appended claims.

Referring to the drawing, an olefin stream in the gaseous phase comprising ethylene, propylene and butylene in admixture with saturated hydrocarbons is passed through line 10 to counter-current tertiary olefin absorber 11 near the bottom. Sulfuric acid, having a concentration of 50–70 weight percent on an acid-water basis is charged at a temperature of about 55°F. through line 12 to the top of tower 11. The tertiary olefin absorber tower 11 is operated at a top temperature of about 75°F. and a vapor outlet pressure of about 10 psig so that unabsorbed materials including normal butylene pass out of the tower through line 13. The butylene vapors rise in the tower along with other hydrocarbon vapors and the isobutylene reacts with the descending sulfuric acid. A liquid layer comprising dilute sulfuric acid and absorbed isobutylene collects in the bottom of the absorber 11 and is withdrawn through line 14 for further treatment, not shown, to recover the isobutylene.

The hydrocarbon vapor comprising ethylene, propylene, and normal butylene in admixture with saturated hydrocarbons recovered from the isobutylene absorption column 11 passes via line 13 into a second olefin absorption column 14. A stream comprising strong sulfuric acid enters the top of absorption column 14 via line 15. In the second absorption column 14, hydrocarbon gas rises in contact with descending sulfuric acid liquid and substantial amounts of the olefins, propylene and butylene, react with the descending sulfuric acid to form alkyl sulfates. Overhead from the second olefin absorber 14, a hydrocarbon vapor phase comprising propylene and butylene and substantially all of the ethylene and paraffin hydrocarbons is removed via line 16 and passes into a first olefin absorption column 17 at a point near the bottom. A strong acid stream comprising spent sulfuric acid catalysts of a concentration of from about 88 percent to about 92 percent enters the top of the first olefin absorption column 17 via line 18. In the first olefin absorption column 17 the rising hydrocarbon vapors contact the descending sulfuric acid liquid and substantially all the propylene and butylene react to form alkyl sulfates. Overhead from the first absorption column 17, a vapor stream comprising saturated hydrocarbons and ethylene is removed via line 19 and passed into a fuel system, not shown. Liquid, comprising spent alkylation catalyst and alkyl sulfates, is transferred from the bottom of the first absorber 17 via line 15 to the second olefin absorber 14 as hereinbefore described. In the first olefin absorber 17, the propylene and butylene in the presence of a molar excess of sulfuric acid react to form alkyl sulfates, a major amount of which are acid alkyl sulfates, which dissolve into the liquid acid phase. This liquid acid phase comprising unreacted sulfuric acid, alkyl sulfates and alkylation acid contaminants is contacted in the second absorber 14 with the hydrocarbon vapor stream entering via line 13. In the second absorber 14 propylene and butylene are present in a molar excess to the acid alkyl sulfates and the sulfuric acid such that a major portion of the sulfuric acid is converted to alkyl sulfates and a major portion of the acid alkyl sulfates are converted to dialkyl sulfates. The first absorber 17 and the second absorber 14 are operated at a temperature of from about 20°F. to about 60°F. and at a pressure such that the hydrocarbon stream remains in the vapor phase. From the second absorber 14 the liquid acid phase comprising dialkyl sulfates, acid alkyl sulfates, unreacted sulfuric acid and alkylation acid contaminants is removed via line 20 and is charged to a first counter-current extractor 21.

The liquid acid phase enters near the top of the first extractor 21 via line 20 and a liquid hydrocarbon stream comprising isobutane enters near the bottom of the first extractor via line 22. The liquid isobutane stream, in a molar ratio of isobutane to dibutyl sulfate of about 3/1 rises through the first extractor 21 contacting the descending acid phase at a temperature of about 20°F. Dibutyl sulfate present in the acid phase dissolves into the ascending isobutane phase. Additionally, a small amount of polymer oil impurity and diisopropyl sulfate dissolves into the isobutane phase. Overhead from the first extractor 21 a liquid hydrocarbon stream comprising isobutane, dibutyl sulfate, polymer oil, and a small amount of diisopropyl sulfate is recovered via line 23. From line 23 the hydrocarbon stream passes into a first acid treater 24. A strong acid stream comprising spent alkylation acid enters the first acid treater 24 via line 25. The hydrocarbon stream is contacted with the strong acid in about an equal molar ratio of acid to polymer oil. Substantially all the polymer oil reacts with the sulfuric acid to form an acid-oil complex and a substantial portion of the diisopropyl sulfate dissolves into the acid-oil complex. Subsequent to the contact between the hydrocarbon phase and the spent acid, the mixture is separated into a first acid-oil stream and a first treated hydrocarbon phase. The first treated hydrocarbon phase is recovered from the first treater 24 via line 26 and comprises isobutane and dibutyl sulfate substantially free of polymer oil and diisopropyl sulfate. The acid-oil stream is recovered via line 42 for further treatment as hereinafter described.

From line 26 the first treated hydrocarbon phase enters a first alkylation reactor 27. Additional butylene enters the first alkylation reactor 27 via line 50 and additional isobutane enters the first alkylation reactor 27 via line 49. In the first alkylation reactor the isobutane is alkylated with butylene and with dibutyl sulfate to yield alkylated hydrocarbons and 100 percent sulfuric acid. This alkylation reaction is carried out in the presence of an alkylation catalyst with a sulfuric acid concentration of from about 95 percent to about 92 percent at a temperature of about 50°F. under conditions of vigorous agitation sufficient to create an emulsion of hydrocarbon liquid and alkylation catalysts. From the first alkylation reactor 27 an emulsion stream is passed via line 28 into a first acid settler 29 wherein the emulsion is allowed to separate into a hydrocarbon phase and an acid phase by gravity settling. The hydrocarbon phase is withdrawn from the first acid settler 29 via line 30 and is passed to a recovery section, not shown, wherein a high octane, low endpoint alkylated hydrocarbon suitable for use in aviation gasoline is recovered and excess isobutane is recovered for recycle to the alkylation process. A major portion of the acid phase in the first acid settler 29 is returned to the first alkylation reactor 27 via line 31. Fresh makeup sulfuric acid of a concentration from about 98 percent to about 99.5 percent by weight is added to the first alkylation reactor 27 via line 32 at a rate sufficient to maintain the desired alkylation acid concentration. From the first acid settler 29 a spent acid stream of from about 95 percent to about 92 percent is passed via line 33 into a second alkylation reactor 34 as will hereinafter be further described.

In the first extractor 21 as hereinabove described, an acid phase comprising diisopropyl sulfate, unreacted sulfuric acid and acid contaminants is passed from the bottom of the first extractor 21 via line 35 to a point near the top of a second extractor 36. A liquid isobutane stream from line 37 enters near the bottom of the second counter-current extractor 36. In the second counter-current extractor 36, liquid isobutane hydrocarbon rises and the liquid acid phase containing diisopropyl sulfate descends. The diisopropyl sulfate along with acid alkyl sulfates and a small amount of polymer oil dissolves from the acid phase into the ascending isobutane phase. The second counter-current extractor 36 is operated at a temperature of about 40°F. and isobutane is provided in a molar ratio to diisopropyl sulfate of about 6/1 such that substantially all the diisopropyl sulfate is extracted and a substantial amount of acid alkyl sulfates are extracted into the isobutane phase. An acid phase substantially free of diisopropyl sulfate and comprising unreacted sulfuric acid, acid alkyl sulfates and acid contaminants is removed from the bottom of the second extractor 36 via line 51 to further treating, such as burning in a sludge conversion unit, not shown.

Overhead from the second extractor 36 a hydrocarbon stream comprising isobutane, diisopropyl sulfate, acid alkyl sulfates, and a small amount of polymer oil is removed via line 38 and passed into a second acid treater 39. Strong sulfuric acid comprising spent alkylation acid catalysts at a concentration of from about 88 percent to about 92 percent is added to the second acid treater 39 via line 40 in about an equal molar ratio of sulfuric acid to polymer oil. In the second acid treater 39 the hydrocarbon stream and sulfuric acid are intimately mixed and the polymer oil reacts with the sulfuric acid to form an acid-oil complex which is insoluble in the hydrocarbon phase. The hydrocarbon phase and the acid-oil complex are allowed to separate by gravity settling. The separated acid-oil complex contains dissolved acid alkyl sulfates as well as a small amount of diisopropyl sulfates. In order to recover the acid alkyl sulfates and the diisopropyl sulfates from the separated acid-oil, the acid-oil phase is transferred from the second acid treater 39 via line 41 to the top of the second extractor 36. Additionally, the acid-oil phase from the first acid treater 24 which contains dissolved diisopropyl sulfate is charged via line 42 into the top of the second extractor 36. The two acid-oil phases descend the second counter-current extractor 36 along with the acid phase from the first counter-current extractor 21 thereby contacting the ascending isobutane phase such that acid alkyl sulfates and diisopropyl sulfates are extracted from the acid-oil phases into the isobutane phase.

The hydrocarbon phase from the second acid treater 39 comprising isobutane, diisopropyl sulfate, and acid alkyl sulfate is passed via line 43 into a second alkylation reactor 34. Fresh butylene is added to the second alkylation reactor 34 via line 44 and additional isobutane enters the second alkylation reactor 34 via line 45. In the second alkylation reactor 34 isobutane is alkylated with olefin and alkyl sulfates to yield alkylated hydrocarbon and 100 percent sulfuric acid. The isobutane is present in the second alkylation reactor 34 in an excess amount such that isobutane comprises from about 60 to about 80 percent of the hydrocarbon component present in the alkylation reactor 34. The alkylation reaction is carried out at a temperature of about 50°F. in the presence of a sulfuric acid catalyst under conditions of vigorous agitation such that an acid catalyst-hydrocarbon emulsion is formed. The sulfuric acid catalyst has a concentration of from about 88 percent to about 92 percent sulfuric acid. An emulsion stream from the second alkylation reactor 34 is passed via line 46 to a second acid settler 47 wherein the emulsion is allowed, by gravity settling, to separate into a hydrocarbon phase and an acid phase. The hydrocarbon phase comprising alkylated hydrocarbon and excess isobutane is withdrawn from the second acid settler 47 via line 48 and is passed to a recovery section, not shown, wherein alkylated hydrocarbon suitable for use in automobile gasoline is recovered and excess isobutane is recovered for recycle to the alkylation process. The major portion of the acid phase in the second acid settler 47 is returned to the second alkylation reactor 34 via line 52. Additionally, as hereinbefore stated, spent acid from the first acid settler 29 at a concentration of from about 95 to about 92 percent passes as makeup catalyst into the second alkylation reactor 34 via line 33. A spent acid stream is withdrawn from the second acid settler 47 via line 25 and is passed to the first acid treater 24 as hereinbefore described. Another spent acid stream is withdrawn from the second acid settler 47 via line 40 and is passed into the second acid treater 39 as hereinbefore described. A third spent acid stream is withdrawn from the second acid settler 47 and is passed via line 18 into the first olefin absorber 17 as hereinbefore described.

Thus, in one embodiment of the present invention the propylene and butylene recovered from a mixed hydrocarbon stream may be separately recovered as diisopropyl sulfate and as dibutyl sulfate and may be separately reacted in alkylation reactions to yield alkylated hydrocarbon of a superior quality which are unobtainable by following the method of the prior art wherein propylene and butylene are recovered in admixture as their dialkyl sulfates. However, there are many different specific ways in which the improvements of the present invention may be used because of existing conditions or because of charge stocks, especially when used in combination with alkylation when more than one alkylation unit or reactor is operated. Obviously, many modifications and variations of the present invention as hereinabove set forth may be made without departing from the spirit and scope thereof. Therefore, only such limitations should be imposed as are indicated in the appended claims.

I claim:

1. In an alkylation process comprising an alkylation zone, an olefin absorption zone, and an alkyl sulfate extraction zone, wherein used sulfuric acid catalyst from the alkylation zone is contacted with an olefin charged comprising propylene and butylene in the absorption zone to form diisopropyl sulfate and dibutyl sulfate, wherein an acid phase comprising dialkyl sulfates, acid alkyl sulfates, unreacted sulfuric acid and acid contaminants is recovered from the absorption zone, and wherein the absorption zone acid phase is contacted with a light hydrocarbon solvent in the extraction zone to yield a hydrocarbon extract phase comprising light hydrocarbon solvent and dialkyl sulfates and a raffinate phase comprising acid contaminants, unreacted sulfuric acid, and acid alkyl sulfate, and wherein the dialkyl sulfates in the hydrocarbon extract phase are returned to the alkylation zone for reaction with isoparaffin hydrocarbons to produce alkylated hydrocarbons; the improvement for recovering dibutyl sulfate separately from diisopropyl sulfate which comprises:

a. contacting in a first extractor said absorption zone acid phase with said light hydrocarbon solvent at a temperature of from about 0°F. to about 20°F. in a molar ratio of solvent to dibutyl sulfate of from about 1/1 to about 6/1;

b. recovering from said first extractor a first hydrocarbon extract phase comprising solvent and dibutyl sulfate and a first raffinate phase;

c. contacting said first raffinate phase in a second extractor with said light hydrocarbon solvent at a temperature of from about 20°F. to about 60°F. in a molar ratio of solvent to diisopropyl sulfate of from about 2/1 to about 10/1 to yield a second hydrocarbon extract phase comprising solvent and diisopropyl sulfate and a second raffinate phase comprising acid contaminants, acid alkyl sulfates, and unreacted sulfuric acid, and d. recovering from said second extractor a second hydrocarbon extract phase comprising solvent and diisopropyl sulfate.

2. The method of claim 1 wherein the light hydrocarbon solvent is selected from the group consisting of isobutane and isopentane.

3. The method of claim 2 wherein said first hydrocarbon extract phase comprising solvent, dibutyl sulfate, and small amounts of polymeric oils and diisopropyl sulfate is treated in a first treating zone with strong sulfuric acid in a molar ratio of acid to polymer oil of about 1/1 to yield a first treated hydrocarbon phase comprising solvent and dibutyl sulfate and a first treater acid phase comprising acid-oil complex and diisopropyl sulfate, and wherein said second hydrocarbon extract phase comprising solvent, diisopropyl sulfate, acid alkyl sulfates, and small amounts of polymer oil is treated in a second treating zone with strong sulfuric acid to yield a second treated hydrocarbon phase comprising solvent, disopropyl sulfate and acid alkyl sulfate and a second treater acid phase comprising acid-oil complex and alkyl sulfates, and wherein the first treater acid phase and the second treater acid phase are returned to said second extractor.

4. The method of claim 3 wherein the dibutyl sulfate contained in the first treated hydrocarbon phase is reacted with an isoparaffin hydrocarbon selected from the group consisting of isobutane and isopentane in a first alkylation reaction zone in the presence of sulfuric acid catalyst having an acid concentration of from about 95 to about 92 weight percent to yield alkylated hydrocarbon and 100 percent sulfuric acid, wherein the first alkylation reaction effluent is separated into a first alkylation hydrocarbon phase comprising alkylated hydrocarbon and isoparaffin hydrocarbon and a first alkylation acid phase, wherein a portion of said first acid phase is passed to a second alkylation reaction zone as makeup acid, wherein the diisopropyl sulfate of said second treated hydrocarbon phase is reacted with an isoparaffin hydrocarbon selected from the group consisting of isobutane and isopentane in a second alkylation reaction zone in the presence of a sulfuric acid catalyst having an acid concentration of from about 92 percent to about 88 percent to yield alkylated hydrocarbons and 100 percent sulfuric acid, wherein a second alkylation reaction effluent is separated into a second alkylation hydrocarbon phase comprising alkylated hydrocarbon and isoparaffin hydrocarbon and into a second alkylation acid phase, wherein a portion of the second alkylation acid phase is employed as strong acid in said first acid treater, wherein a portion of said second alkylation acid phase is employed as strong acid in said second acid treater, and wherein a portion of said second alkylation acid phase is employed in said absorption zone to absorb propylene and butylene from an olefin charge stock.

5. The method of claim 4 wherein the olefin charge comprising propylene, butylene and inert hydrocarbons is treated with an acid-containing stream in a second absorption zone in a molar ratio of propylene and butylene to sulfuric acid of at least about 2/1 to convert a major portion of said sulfuric acid into dialkyl sulfates, wherein an acid phase from said second absorption zone comprising diisopropyl sulfate, dibutyl sulfate, acid alkyl sulfate, unreacted sulfuric acid and acid contaminants is passed to said first extraction zone, wherein a hydrocarbon stream from said second absorption zone comprising propylene, butylene and inert hydrocarbons is contacted in said first absorption zone with said used sulfuric acid from said second alkylation acid settling zone in a molar ratio of sulfuric acid to propylene and butylene of at least about 1/1, to absorb substantially all of the propylene and butylene present, wherein a hydrocarbon stream comprising inert hydrocarbons is removed from said first absorption zone and wherein an acid stream from said first absorption zone comprising propyl sulfates, butyl sulfates, unreacted sulfuric acid and acid contaminants is used as said acid-containing stream in said second absorption zone.

6. The method of claim 5 wherein the butylene component of said olefin charge comprises isobutylene and normal butylene, wherein said olefin charge is contacted with dilute sulfuric acid in a tertiary olefin absorption zone, wherein an acid stream comprising dilute sulfuric acid and absorbed tertiary olefins is removed from said tertiary olefin absorption zone, and wherein a hydrocarbon stream comprising secondary olefins substantially free of tertiary olefins is passed from said tertiary olefin absorption zone as said olefin charge to said second absorption zone.

* * * * *